United States Patent

Kotha et al.

[11] Patent Number: 6,063,326
[45] Date of Patent: May 16, 2000

[54] METHOD OF THERMOFORMING A THIN MULTI-LAYER FLEXIBLE FILM

[75] Inventors: Srinivas Kotha, Ypsilanti; Noman Shafi, Canton, both of Mich.; Huan-Kun Chang, Sylvania, Ohio; Frederick J. Homburg, Woodhaven, Mich.

[73] Assignee: Ford Motor Company, Dearborn, Mich.

[21] Appl. No.: 09/152,315

[22] Filed: Sep. 14, 1998

[51] Int. Cl.⁷ .................................................. B29C 51/10
[52] U.S. Cl. ........................ 264/547; 264/292; 264/553; 264/554; 425/388
[58] Field of Search .................................. 264/547, 553, 264/554, 292, 548; 425/388

[56] References Cited

U.S. PATENT DOCUMENTS

| | | | |
|---|---|---|---|
| 2,968,064 | 1/1961 | Howell | 264/554 |
| 3,337,664 | 8/1967 | Lyon | 264/547 |
| 3,574,807 | 4/1971 | Heavener | 264/554 |
| 3,816,051 | 6/1974 | Houghton | 425/388 |
| 3,933,562 | 1/1976 | Cruckshank et al. | 156/250 |
| 4,123,215 | 10/1978 | Madenokoji | 425/388 |
| 4,941,212 | 7/1990 | Liff | 264/554 |
| 4,975,236 | 12/1990 | MacLachlan | |

FOREIGN PATENT DOCUMENTS 2187132   9/1987   United Kingdom .

*Primary Examiner*—Jan H. Silbaugh
*Assistant Examiner*—Dae Young Lee
*Attorney, Agent, or Firm*—Damian Porcari

[57] ABSTRACT

A method of thermoforming a thin flexible film comprising a series of steps. A thin flexible film capable of being thermoformed is heated until it is pliable. A mold having first and second surfaces on different planes forms a thermoformed article having a contoured surface. A first portion of the pliable film is contacted with the first surface. A first vacuum is applied through the first surface to draw the first portion against the first surface. After the first portion of the film is drawn against the first surface, a second portion of the film contacts the second surface. A second vacuum is applied through the second surface to draw the second portion of the film against the second surface. Air trapped between the mold and the film is first removed between the first surface and the first portion of the film and then removed from between the second surface and the second portion of said film so that the thermoformed article is substantially defect-free.

10 Claims, 4 Drawing Sheets

METHOD OF THERMOFORMING A THIN MULTI-LAYER FLEXIBLE FILM

BACKGROUND OF THE INVENTION

1. Field of the Invention

The present invention is directed to a method of thermoforming a thin, flexible film. More specifically, the present invention is directed to thermoforming a film using the application of sequential vacuums to avoid trapped air pockets that produce surface defects in the film.

2. Description of the Related Arts

It is known to manufacture a thermoformed film using a forming mandrel and a hinged frame. British patent application No. GB2187132 teaches draping a flat sheet over a mold having a face and two sides and then manipulating a frame to wrap the sheet along the mold sides. The frame may be manipulated before or after contacting the sheet with the mold. A vacuum is applied to the film through apertures in the mold surfaces to cause the sheet to conform to the mold. The vacuum is applied simultaneously to both the face and sides of the mold. When the film seals around the mold, the vacuum causes the film to be drawn against the mold and conform to the mold surface. The vacuum fixes the film in position and prevents further stretching. The early application of vacuum before the film can be completely stretched around the mold causes the film to stick to the mold surface before it can be stretched over the mold sides. This causes small pockets of air to be trapped between the film and the mold in areas that lack vacuum apertures. These air pockets cause the film to display an irregular surface appearance.

U.S. Pat. No. 4,975,236 ('236) recognized the problem of surface defects and explained them as "cold-flow lines". The cold-flow lines, better called chill lines, occur when the hot pliable film contacts the cooler mold surface. A portion of the film cools and sticks to the mold surface. As the remaining portion of the film contacts the mold, lines form between the cooled portion and the remaining portion (chill lines). The early application of the vacuum exacerbates this problem. Portions of the film that are not in contact with the mold surface continue to stretch and become thinner and cause an irregular surface appearance in the film because the areas that contact the mold first are thicker than areas that contact the mold later.

The '236 patent attempted to overcome these chill lines by manipulating the frame that holds the film independently of the mold movement. This enabled the film to be "pre-shaped" to conform to the mold prior to contacting the mold and film. In the embodiment described, the mold is U-shaped. The sides of the frame holding the film are moved upwards to form a U-shape that conforms the film to the mold. After the film is pre-shaped, it is contacted with the mold and a vacuum is applied between the mold and film to cause the film to conform to the mold shape. Because the film contacts both the face and sides of the mold substantially simultaneously, portions of the film will stick to the outermost region of the mold surface. A vacuum is applied only after the film contacts the mold (column 4, lines 45–48). This allowed the film to stretch over the mold, but it did not eliminate the trapped air pockets. It also did not enable a portion of the film to be fixed in position while the remainder of the film is stretched over the mold.

Both the British application and the '236 patent are directed to making relatively thick parts by pre-shaping the film before it contacts the mold. This pre-shaping does not reduce the effects of chill lines. The British application is directed to making refrigerator liners and the '236 patent is directed to making a truck canopy. These films are generally thicker than 3.0 mm and are less sensitive to displaying chill lines and trapped air pockets. Thicker films lose less heat and therefore cool more slowly than thin films. Thin films cool much more quickly when they contact the mold wall. This rapid cooling produces more pronounced chill lines. Thicker films have a small percentage difference between thicker and thinner areas. Thinner films have a very large percentage difference between thicker and thinner areas. The separation between these areas becomes more visible in thin films. Visible surface imperfections such as chill lines, trapped air pockets or surface defects all mar the finished article. This becomes especially important when the article must display a very high degree of gloss and distinction of image as needed for exterior automotive applications.

The present invention is directed to thermoforming relatively thin films between 0.2 and 1.0 mm. Thermoformed thin films having a glossy surface are more sensitive to displaying imperfections caused by chill-lines and air pockets. These and other disadvantages of the prior art are overcome by the present invention.

SUMMARY OF THE INVENTION

The present invention is directed to a method of thermoforming a thin flexible film comprising a series of steps. A thin flexible film capable of being thermoformed is heated until it is pliable. A mold having first and second surfaces on different planes forms a thermoformed article having a contoured surface.

A first portion of the pliable film is contacted with the first surface. A first vacuum is applied through the first surface to draw the first portion against the first surface. After the first portion of the film is drawn against the first surface, a second portion of the film contacts the second surface. A second vacuum is applied through the second surface to draw the second portion of the film against the second surface. Air trapped between the mold and the film is first removed between the first surface and the first portion of the film and then removed from between the second surface and the second portion of the film so that the thermoformed article is substantially free of surface defects.

The process improves upon the prior art by removing air that is normally trapped between the mold and film. This trapped air forms pockets that display an irregular or defective surface appearance. It also reduces the effect of chill lines by allowing the film to be draped substantially over the mold surface prior to engaging the vacuum and fixing the film in position. Nearly all of the film stretching occurs before the application of the vacuum.

The invention also includes an articulated frame that enables a portion of the film to be wrapped around the second surface of the mold. By coordinating the movement of the frame and the engagement of the vacuum, defect-free thermoformed articles may be produced using relatively thin films.

Further objects and advantages of the present invention will become more apparent from the following description and reference to the attached drawings.

DETAILED DESCRIPTION OF THE PREFERRED EMBODIMENTS

Figure 1:
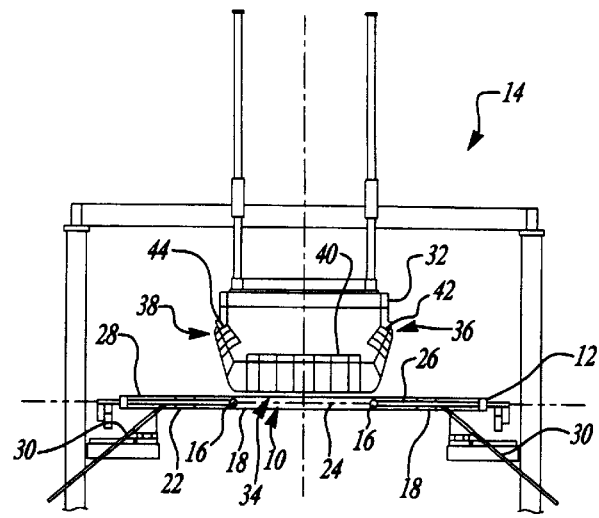
FIGS. 1–10 are side views of a thermoforming apparatus performing the various forming operations of the present invention.

The present invention will be described through a series of drawings, which illustrate the thermoforming operation claimed. The invention will also be described as a method of manufacturing the thermoformed outer skin of an automotive bumper fascia, however other components may also be manufactured using the same or similar process, technique and equipment, and are included within the invention described herein.

The following items are a word list of the items described in the drawings and are reproduced to aid in understanding the invention:

- 10 film
- 12 clamp frame
- 14 forming press
- 16 hinges
- 18 frame center section
- 20, 22 frame side sections
- 24 film center portion
- 26, 28 film side portions
- 30 lifters
- 32 mold
- 34 mold center surface
- 36, 38 mold side surfaces
- 40, 42, 44 vacuum apertures
- 46 thermoformed article A roll of film having a plastic backing and a painted surface is placed within a film loading station. A length of film is unspooled from the roll. The film is cut to a length slightly longer than the finished thermoformed article. The cut film 10 is placed within a clamp frame 12 as shown in FIG. 1. The clamp frame 12 retains the periphery of the film 10 during the following thermoforming steps. The film 10 is heated in a controlled oven (not shown) and then positioned below a vertical forming press 14. While a vertical forming press above the film is shown, a horizontal press or a vertical press below the film are also useful for the present invention.

The clamp frame 12 includes hinges 16 that enable the frame to fold or pivot. The frame 12 includes a center section 18 and side sections 20, 22. The frame side sections 20, 22 are moved to a different plane then the center section 18 when the frame 12 is folded. The film 10 includes a center portion 24 within the frame center section 18 and side sections 26, 28 within the frame side sections 20, 22. The film portions move in conjunction with the frame portions. Two lifters 30 move the frame 10 between horizontal and folded positions. he lifters 30 are shown in the retracted position in FIG. 1.

The forming press 14 includes a vertically moving mold 32. The mold 32 has a center surface 34 and side surfaces 36, 38. The side surfaces 36, 38 are in different planes than the center surface 34 and form a three-dimensional contoured article. The center surface 34 includes vacuum apertures 40 and the side surfaces 36, 38 include vacuum apertures 42, 44. The vacuum apertures 40, 42, 44 are independently controlled to apply or remove a vacuum to the various mold surfaces.

Figure 2:
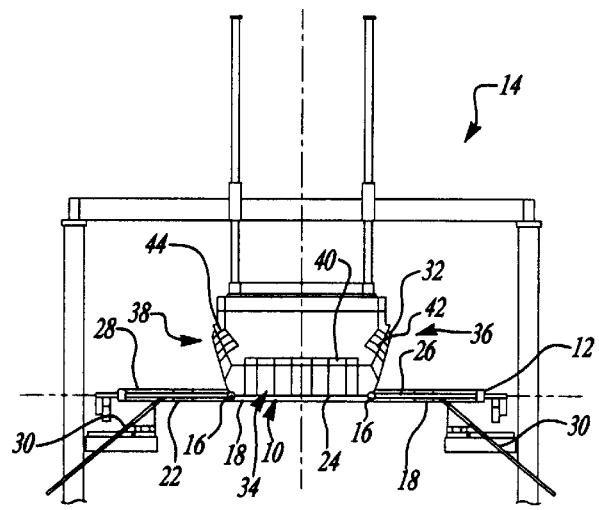
Figure 3:
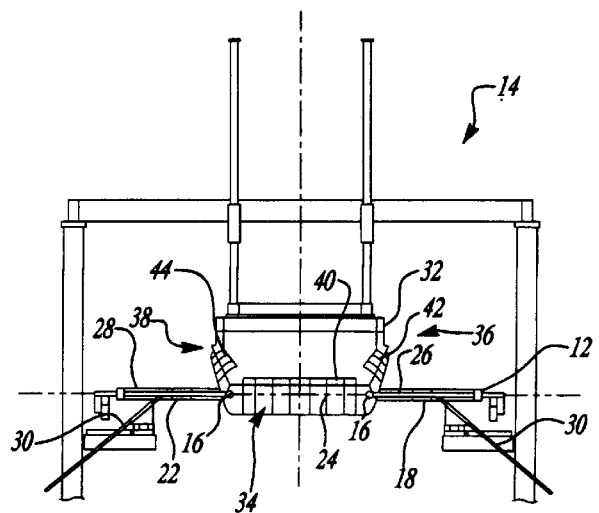

The mold 32 is moveable between a fully raised and a fully lowered position by a controller (not shown) that is able to precisely control the position of the mold 32 during the forming operation. At the start of the forming process, the mold 32 is moved to a raised position above the film 10. The mold 32 is then lowered to contact the film 10 as shown in FIG. 2. The contact between the mold center surface 34 and the film center portion 24 causes the film 10 to slide over the mold surface. A vacuum is not applied at this time to allow for this sliding movement. After the mold 32 reaches a partially lowered position, a vacuum is applied to vacuum apertures 40 as shown in FIG. 3. The vacuum causes the film center portion 24 to closely conform to the mold center surface 34 and fixes the film 10 in position and prevents further sliding movement.

Figure 4:
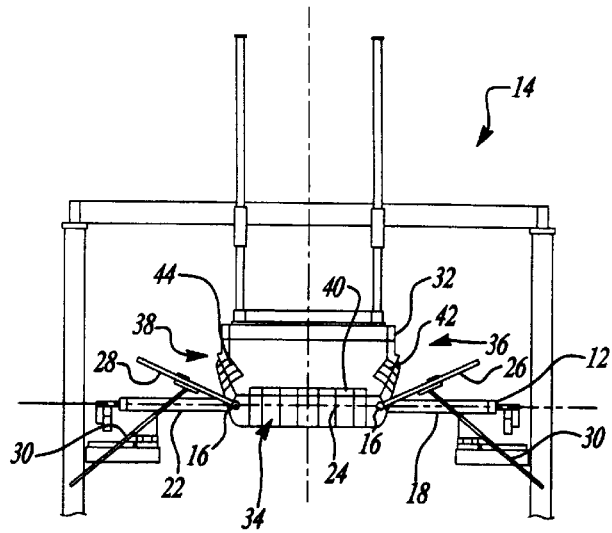
Figure 5:
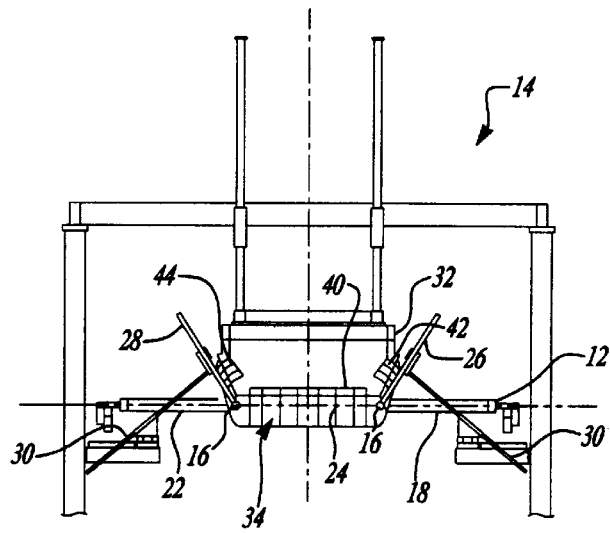
Figure 6:
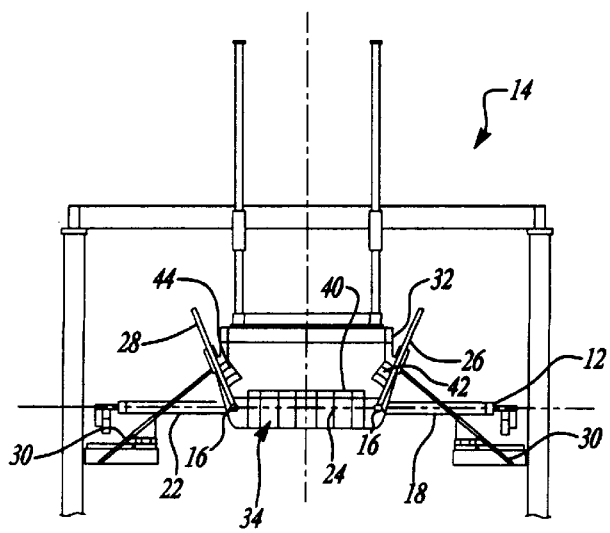
Figure 7:
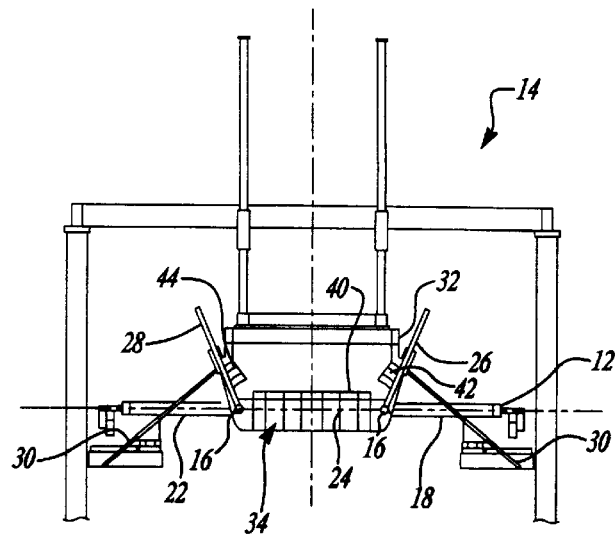
Figure 8:
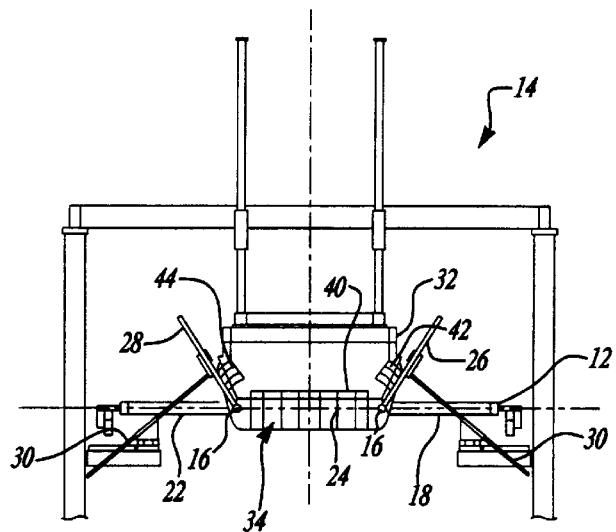
Figure 9:
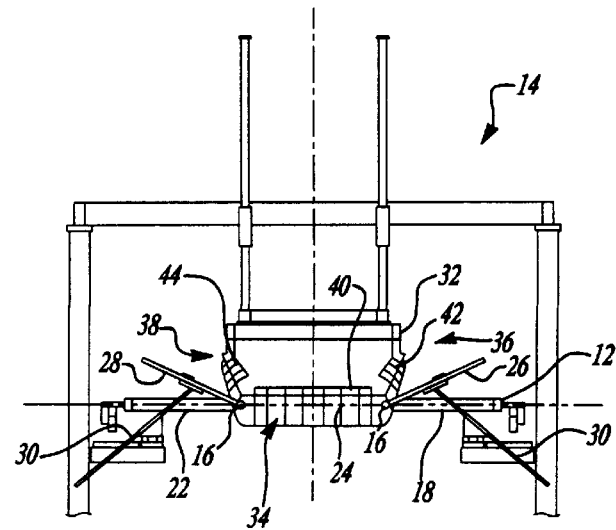
Figure 10:
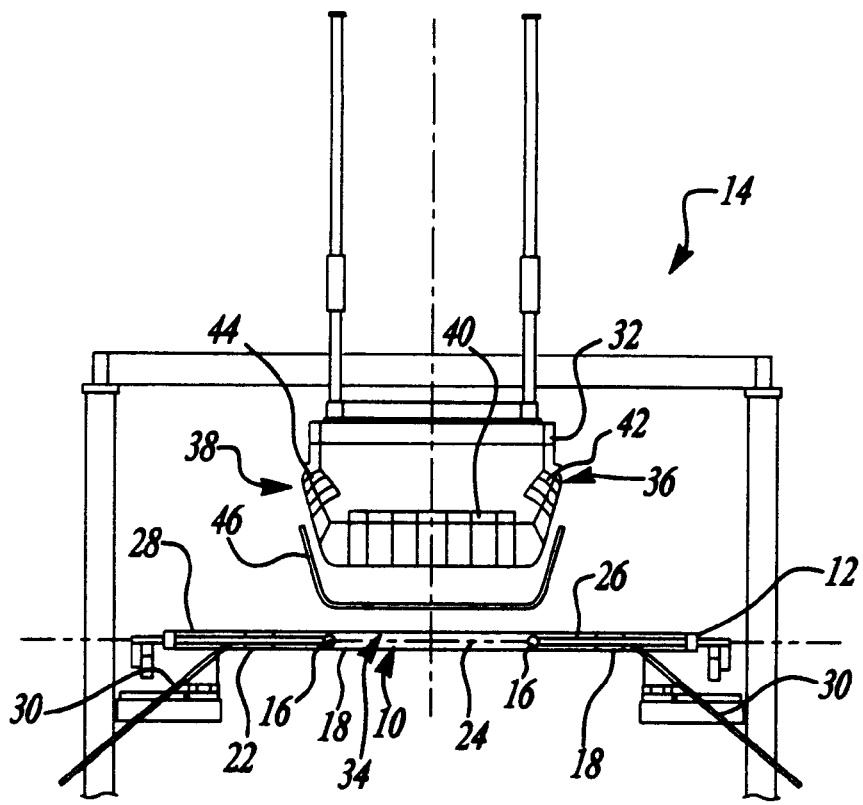

The lifters 30 raise the frame side sections 20, 22 to the folded position as shown in FIGS. 4–6. The mold 32 continues its downward movement to a fully lowered position as shown in FIG. 6. The lifters 30 raise the frame side sections 20, 22 to a raised position and cause the film side sections 26, 28 to contact the mold side surfaces 36, 38. A vacuum is applied to the vacuum apertures 42, 44 to draw the film side portions 6, 28 against the mold side surfaces 36, 38. The frame 12 releases the periphery portion of the film 10 and is lowered to a horizontal position as shown in FIGS. 7–10. The vacuum retains the film 10 on the mold 32 as the mold 32 is moved back to a raised position. The vacuum is withdrawn and air is forced through the mold center surface 34 and side surfaces 36, 38 to remove the article 46 from the mold 32. The air may be applied first to the vacuum apertures 42, 44 to first remove the film side portions 26, 28 and then applied to the apertures 40 to remove the film center portion 24. The order of blow-off is dependent on the article shape and if the article is constrained by die-lock. The frame 12 is returned to receive a new film 10 and the mold 32 is raised to the retracted position and the cycle repeated as shown in FIG. 10.

The invention produces a defect free article by reducing or eliminating the effects of chill lines and air pockets. The use of a sequential vacuum allows the film to be draped over and conform to a first portion of the mold surface. This first portion is then fixed in position and tightly drawn against the mold by the first vacuum. The remaining portions of the film are not in contact with the mold. As the film conforms to the mold, different portions of the film are draped over different portions of the mold. A vacuum is applied to these different mold portions to conform the film portion to the mold surface. This enables the film to be generally uniformly stretched over the mold and thus reduces the percentage difference between the thickest and thinnest film sections. This also reduces the visibility of chill lines.

In the embodiment described, a vacuum is applied sequentially, first at the center surface 34 and then later at the side surfaces 36, 38. This enables the center portion 24 to be fixed in position as the side portions 26, 28 draped over the mold side surfaces 36, 38. However, the vacuum sequence may be reversed based on the nature of the article. Complex articles may be formed from thin films by contacting and then drawing a vacuum on discrete portions of the film as it is draped over the mold. If the vacuum is applied before the film contacts the mold, it would deplete the vacuum reservoir. If the vacuum is applied too late, the film will have cooled and become too rigid to conform to the mold shape.

The use of a sequential vacuum allows a portion of the film to be contacted with the mold while the remainder of the film remains hot and pliable. The integration of the mold movement and the controlled application of sequential vacuums allows the production of complex shapes having recessed and curved surfaces.

The invention has been illustrated using two vacuums applied to a first and second portion of the mold. More vacuums applied at various times are within the scope of the invention. The invention also has been described using two mold surfaces at right angles. The mold surfaces may be placed at any angle or at the same angle but on different planes (so as to form a recess). While the best modes for carrying out the invention have been described in detail, those familiar with the art to which this invention relates will recognize various alternative designs and embodiments for practicing the invention as defined by the following claims.

What is claimed:

1. A method of thermoforming a thin flexible film comprising the steps of:

providing a flexible film. heating said film to make said film pliable;

providing a mold having a first surface and a second surface, said second surface located on a different plane to form a thermoformed article having a contoured shape;

moving said mold relative to said pliable film and thereby contacting a first portion of said pliable film and said first surface;

applying a first vacuum through said first surface to draw said first portion of said film against said first surface;

after said first portion of said film is drawn against said first surface, further moving said mold relative to said pliable film, thereby contacting a second portion of said film with said second surface; and then applying a second vacuum through said second surface to draw said second portion of said film against said second surface, whereby air trapped between said mold and said film is first removed between said first surface and said first portion of said film and then from between said second surface and said second portion of said film so that said thermoformed article is substantially defect-free.

2. The method of claim 1, wherein said film has a decorative surface and a backing surface and said backing surface includes said first and second portions of said film.

3. The method of claim 1, wherein said film has a peripheral portion and is retained by said peripheral portion.

4. The method of claim 3, further comprising a frame retaining said film peripheral portion.

5. The method of claim 4, wherein said frame has a first section retaining said first portion of said film and a movable second section retaining said second portion of said film and said method further comprising after contacting said first portion of said film with said first surface, moving said second section of said frame to cause said second portion of said film to contact said second surface.

6. The method of claim 5, wherein said second vacuum is initiated after said first portion of said film contacts said first surface, but prior to said second portion of said film contacting said second surface.

7. The method of claim 1, wherein said film has a thickness between 0.2 and 1.0 mm.

8. A method of thermoforming a thin flexible film having a peripheral portion, a decorative surface and a backing surface comprising the steps of:

retaining said flexible film by said peripheral portion in a pivoting frame, said frame having a first section retaining a first portion of said backing surface and a movable second section retaining a second portion of said backing surface;

heating said film to make said film pliable;

providing a mold having a first surface and a second surface, said second surface located on a different plane to form a thermoformed article having a contoured shape;

contacting said first portion of said pliable film and said first surface;

applying a first vacuum through said first surface to draw said first portion of said film against said first surface;

after said first portion of said film is drawn against said first surface, moving said second section of said frame to cause said second portion of said film to contact said second surface; and applying a second vacuum through said second surface to draw said second portion of said film against said second surface, whereby air trapped between said mold and said film is first removed between said first surface and said first portion of said film and then from between said second surface and said second portion of said film so that said thermoformed article is substantially defect-free.

9. The method of claim 8, wherein said second vacuum is initiated after said first portion of said film contacts said first surface, but prior to said second portion of said film contacting said second surface.

10. The method of claim 8, wherein said film has a thickness between 0.2 and 1.0 mm.

* * * * *